Patented Feb. 16, 1932

1,845,342

UNITED STATES PATENT OFFICE

BYRAMJI D. SAKLATWALLA, OF CRAFTON, PENNSYLVANIA, ASSIGNOR TO VANADIUM CORPORATION OF AMERICA, OF BRIDGEVILLE, PENNSYLVANIA, A CORPORATION OF DELAWARE

TREATMENT OF TITANIUM AND IRON CONTAINING MATERIALS

No Drawing.   Application filed February 2, 1928.   Serial No. 251,464.

The present invention relates to the treatment of titanium and iron containing materials, and more especially to titanium and iron containing ores such as ilmenite. The invention relates more especially to the removal of the iron from such materials or ores by a chlorination process. The ore is subjected to a chlorinating gas at a temperature which is sufficient to chlorinate the iron and remove it by sublimation while leaving the titanium residue substantially chemically unaffected.

My invention will be described specifically as embodied in the process for the treatment of ilmenite, it being understood, however, that the process may be otherwise used.

Ilmenite is a titanium-iron oxide of the general formula $FeO, TiO_2$, and it contains various impurities such as silicious material. The ilmenite ore is first concentrated, in any of the usual ilmenite concentration processes, to obtain an ilmenite concentrate. An ilmenite concentrate may be obtained containing about 48 to 50% $TiO_2$, the remainder being principally iron oxide together with some of the silicious gangue.

This concentrate is finely ground, preferably to pass through a screen of 300 meshes to the inch.

The ground ore is put through a furnace or kiln in which it is chlorinated. Preferably a revolving flame heated kiln, like a cement kiln, is used, and the material is passed continuously through it counter-current to the stream of chlorinating gas. However, other forms of kilns or furnaces may be used in which the ore is exposed, by the rolling of the kiln or by rabbling, to the action of the chlorinating gas. A chlorinating gas, such as chlorine or hydrogen chloride, preferably dry chlorine, is passed through the furnace. A working temperature in the furnace is maintained at about 1450° Fahrenheit. This temperature should not exceed about 1500° Fahrenheit. At about 1500° Fahrenheit the titanium oxide of the ore starts to chlorinate. At a temperature below this the titanium oxide as it exists in the ilmenite ore is substantially unaffected by chlorine gas. However, the working temperature of 1450° Fahrenheit is sufficient to cause the combination between the chlorine gas and the iron oxide constituents of the ilmenite ore. The iron is chlorinated to an iron chloride which is volatile at this temperature and which is sublimated and carried away with the stream of gas. The iron chloride may be deposited in cooling and collecting chambers and the unused gas may be recirculated, together with additions of fresh chlorine gas, through the kiln. The iron chloride may be decomposed by heat and the chlorine thus regenerated.

The ilmenite concentrate in which the iron and titanium is in the oxide form, is subjected to the chlorinating treatment. I have found that a much better separation of the iron from the titanium may be obtained in this way than is possible by a treatment in which the titanium concentrate is mixed with a carbonaceous material. The presence of a carbonaceous material will reduce the iron and lower its chlorination temperature. However, the presence of the iron has a reducing effect on the titanium content and lowers its chlorination temperature, so that the titanium, as well as the iron, will be chlorinated.

I have found that by using the ilmenite concentrate without a carbonaceous reducing agent I can get a selective separation of the iron by the dry chlorinating treatment and leave the titanium as a residue in the oxide form.

While the chlorine does not materially chemically affect the titanium containing residue, it affects its physical properties. The ilmenite is apparently a combination of titanium, iron and oxygen. When the iron is removed by the chlorinating treatment, the original crystalline mineral structure is broken down and the residue is left in a softer more porous condition which may be readily ground to an impalpable powder for use as paint pigments, etc.

The chlorinating treatment as thus carried out removes substantially all of the iron from the ore, leaving a residue which consists principally of titanium dioxide together with a small amount of silicious impurities or the like which were present in the concentrate. This residue may be used directly and without further treatment in the manufacture of pigments by grinding it to the desired fineness. By properly concentrating ilmenite ore, a titanium oxide may be obtained by the chlorinating treatment sufficiently pure for most commercial pigment purposes.

The titanium oxide may, of course, be further refined if a very pure product is desired. Also, the chlorinating process may be used on materials which contain a considerable amount of impurities other than iron, in which case the residue may be subjected to further purification to obtain the titanium oxide of the desired degree of purity.

While I have specifically described the preferred manner of carrying out my process, it will be understood that the process may be otherwise practiced within the scope of the following claims.

I claim:

1. The process of treating titanium-iron containing materials, which comprises subjecting the materials without previous reduction to the action of a chlorinating gas in the absence of a reducing agent at a temperature sufficient to chlorinate the iron and remove it by sublimation while leaving the titanium residue substantially chemically unaffected.

2. The process of treating ores containing iron and titanium oxides, which comprises subjecting such ore with the titanium and the iron in their original oxidized condition to the action of a chlorinating gas at a temperature of not over about 1500° Fahrenheit, so as to chlorinate the iron and remove it by sublimation while leaving the titanium oxide as a residue.

3. The process of treating ilmenite ore, which comprises subjecting the ore without a reducing agent to the action of chlorine at a temperature of not over about 1500° Fahrenheit, so as to chlorinate the iron and remove it by sublimation while leaving the titanium content of the ore as a residue.

4. The process of treating ilmenite ore, which comprises subjecting the ore without a reducing agent to the action of a chlorinating gas at a temperature sufficient to chlorinate the iron and remove it by sublimation but insufficient to chlorinate the titanium content of the ore.

5. The process of converting ilmenite ore into an impure titanium oxide suitable for pigment purposes, which comprises subjecting the ore in an unreduced condition and without a reducing agent to the action of a chlorinating gas at a temperature sufficient to chlorinate the iron, remove it by sublimation and break down the original crystalline mineral structure of the ore leaving the titanium-containing residue in a softer more porous condition suitable for grinding into a pigment.

6. The process of treating materials containing titanium-iron-oxygen compounds, which comprises subjecting such material in an unreduced condition to the action of a chlorinating gas at a temperature sufficient to chlorinate the iron and remove it by sublimation and change the physical properties of the titanium-containing residue while leaving it substantially unaffected chemically.

7. The process of making titanium oxide of a character suitable for pigment purposes from titanium- and iron-containing ores, which comprises subjecting such ores without a preliminary reducing operation and in the absence of a reducing agent to a chlorination process in the absence of a reducing agent and at a temperature of not over 1500° F. but sufficiently high to break down the original crystalline structure of the ore, whereby the iron is chlorinated and removed leaving the titanium oxide in a condition in which it may be readily ground to form a pigment.

8. The method of breaking down the crystalline structure of an iron-containing titaniferous ore to form a soft porous residue containing titanium dioxide and suitable for pigment purposes, which comprises concentrating and finely grinding the ore, subjecting the finely ground ore in an unreduced condition and in the absence of a reducing agent to the action of a chlorinating gas at a temperature sufficient to chlorinate the iron and remove it by sublimation and break down the original crystalline mineral structure of the ore, leaving the titanium-containing residue in a condition in which it may be readily ground to a powder for pigment purposes.

In testimony whereof I have hereunto set my hand.

BYRAMJI D. SAKLATWALLA.